United States Patent Office 3,332,866
Patented July 25, 1967

3,332,866
PROCESS FOR ELECTRODEPOSITING OXIDIZED POLYETHYLENE
Walter R. Wszolek, Ellicott City, Md., assignor to W. R. Grace & Co., New York, N.Y., a corporation of Connecticut
No Drawing. Filed Mar. 12, 1964, Ser. No. 351,547
6 Claims. (Cl. 204—181)

This invention relates to a novel means of producing oxidized polyethylene coatings on metal surfaces.

In summary, this invention consists of depositing a coating of oxidized polyethylene on an electrically conductive body by electrolyzing an aqueous oxidized high density polyethylene emulsion composition into which emulsion said body is immersed and is so connected to the current source as to be the electrode upon which the polyethylene is deposited.

I have found that thick coatings of oxidized polyethylene may be deposited on metal or other conductive surfaces in less time and more economically, than by repeated dipping and drying. Also, I have found a means of coating irregularly shaped metallic conductive objects.

This method of coating metallic objects is of value wherever a polyethylene coating is desired on metal, i.e., to protect small parts in a mechanical system, or on metal sheeting which then could be fabricated into drums or other such containers, the container combining the strength of metal with the inertness of polyethylene. Also, the oxidized polyethylene coatings used in the instant inventive process are quite ink-receptive, due to the presence of oxidized groups.

The oxidized polyethylene composition which is electrolyzed in this invention can be prepared from commercial high density polyethylene having a density of 0.94 to 0.98, a melting point of 128–138° C. and melt index of less than 0.01. This oxidized polyethylene usually contains 0.20 to 1.0 milliequivalents carboxyl per gram of oxidized polyethylene. Sufficient base is added to the oxidized polyethylene to neutralize the acid groups on the polymer. The composition also contains an emulsifying agent, which can be anionic, cationic, or neutral, the emulsifying agent present in from 1 to 40 parts per weight of the oxidized polyethylene. The emulsion composition has a water-oxidized polyethylene ratio of 80 to 2000:100 parts by weight respectively.

The emulsified oxidized polyethylene as used in the specific examples is protected by an anionic emulsification system. This means that the polymer globules are surrounded by a net negative charge; in an electrolytic circuit these globules migrate to the anode where they are deposited. However, the electrolytic process is applicable also to a cationic emulsification system, whereby the polymer would be deposited on the cathode. If a nonionic emulsifier is preferred, since in some cases a nonionic system shows more stability than charged systems, this electrolytic procedure would also be applicable. In this latter case, instead of having a charged "cloud" around the polymer which would be attracted to an electrode, the "cloud" would be neutral while the polymer molecule, which contains carboxyl groups, would be charged enough (negatively) to migrate on its own to the anode.

The electrodes can be of substantially any metal or other conductive substances, e.g., aluminum, copper, tin, brass, iron, metallic alloys, and the like.

The voltage used is dependent on the speed required for the electrodeposition, although care should be taken that thick layers are not deposited so quickly, so that irregularities develop on the surface. In general, voltage should be 20–150 volts. Preferred voltage is 20–25 volts.

The current is a function of the voltages used, and the resistance of the polymer emulsion. With the instant conditions, current measured about 3–4 amps in the preferred voltage ranges; 3–25 amps in the operable voltage range.

Time of electrolysis again is dependent on the amount of polyethylene to be deposited, and also on the concentration of the emulsion. Since the preferable emulsion concentration is 15–28 weight percent of total solids, the time of electrolysis must be calculated to yield the required depth of polymer. Generally, with 20% T.S. content, a voltage of 22.5 volts, e.g., from a standard "B" battery and electrolysis time of 5 minutes, a 3.5–3.7 mil thickness of polyethylene will be deposited.

The temperature of electrolysis can be varied between wide limits, i.e., 15° C. to about 110° C. or below the softening point of the oxidized polyethylene. Most conveniently, the experiment can be performed at about room temperature: 20–28° C.

The volume of solution used should be sufficient to allow the electrode to be coated to be submersed to desired level, and also such that the solution contains enough polymer/emulsifier to deposit to the desired depth, and also to continue to support current. This factor is most easily determined experimentally.

EXAMPLE I

The oxidized polyethylene emulsion used in the instant invention is prepared using the following process.

200 pounds of commercial high density polyethylene (such as that prepared using Phillips-process catalyst systems) having a density of 0.955, a melting point of 135° C., a specific viscosity of 4.5, and a melt index of 0.0 was oxidized by tumbling in a ribbon blender at 114–118° C. for 57 hours while passing air over it. The thus oxidized polyethylene on characterization has a melt index of 540, a melting point of 130° C., and contained 0.50 milliequivalent carboxyl/gm. of oxidized polyethylene.

1000 g. of the oxidized polyethylene prepared above along with 1800 g. oleic acid, 1750 g. morpholine and 45,000 g. distilled water were charged to a 25 gallon "Pilot Plant" kettle. The function of the morpholine is twofold: it acts as the base which neutralizes the carboxyl groups on the polymer and also reacts with the emulsifying agent, i.e., oleic acid, to form morpholine oleate. Agitation was started at slow speed, and then steam was admitted with the vent open. When the temperatures reached 96–97° C. the vent was closed and stirring speed increased to the maximum. The mixture was then heated at 139–142° C. for 30 minutes while stirring was continued. The mixture was then cooled by a water jacket while continuing stirring. The vent was opened when the pressure reached 0 p.s.i. When the temperature reached 50–52° C., the emulsion was removed, and stored in polyethylene line containers until needed. Analysis of the emulsified product yielded a total solids weight/volume percent of 20.3 g./cc. percent.

The emulsifying agent used in this emulsion preparation is morpholine oleate, which acts as an anionic agent. Other sutable anionic emulsifying agents include amine salts of fatty acids: suitable amines are monoethanol amine, 2-amino-2 methyl-1 propanol, aniline, and the like. Sodium, potassium and ammonium salts of the fatty acids are also operable but somewhat less satisfactory. Salts of alkyl aryl sulfonic acid have also been used as emulsifying agents with good results. Operable ionic emulsifiers in the cationic class include, but are not limited to, acetate salts of long chain aliphatic amines. Examples of a few operable non-ionic emulsifiers are polyoxyethylene esters of fatty acids, polyoxyethylene ethers of long chain alcohols, polyoxyethylene ethers of alkyl aryl phenols or combinations thereof.

minutes, it was removed, shaken, dried 10 minutes at 105° C. and sintered for 5 minutes at 140° C. The results of weighing and measuring are summarized in Table I.

TABLE I

| Sample | Weight Before, gm. | Weight After, gm. | Weight Gain, gm. | Thickness in mils before | Thickness in mils after | Increase in thickness, mils |
| --- | --- | --- | --- | --- | --- | --- |
| (Example II): | | | | | | |
| Positive Electrode | 1.10 | 1.32 | 0.22 | 5.4 | 9.0 | 3.6 |
| Negative Electrode | 1.10 | 1.12 | 0.02 | 5.4 | 5.8 | 0.4 |
| (Example III): Control | 1.10 | 1.13 | 0.03 | 5.4 | 6.0 | 0.6 |

If a nonionic emulsifier is used, a basic agent to neutralize the carboxylic groups formed by oxidation of the polymer must be added, since the emulsifier does not perform the dual role as with the ionic emulsifiers. Inorganic bases, such as KOH and NaOH are suitable. The amount of emulsifier employed is from 1 to 50 parts, preferably 3 to 30 parts emulsifier/100 parts oxidized polyethylene by weight.

The following examples illustrate, but do not limit, the inventive concept.

EXAMPLE II

Two pieces of 5.4 mil thick aluminum of approximately the same dimensions (3.8 cm. x 8.8 cm.) were abraded with emory paper, dipped in 10% HCl for a few minutes, rinsed with tap water, followed by distilled water rinsing. After drying with absorbent paper, both pieces weighed 1.10 grams. The aluminum samples were used as electrodes by connecting through alligator clips and copper wire to a 22.5 volt Eveready No. 778 battery, which provided a source of direct current. The electrodes were then completely immersed in the oxidized polyethylene emulsion as prepared in Example I. The emulsion was at a temperature of 25° C. Electrolysis was allowed to progress for five minutes under 3.6 amperes of current. The electrodes were removed, shaken to remove excess emulsion, dried in an oven for 10 minutes at 105° C., and then sintered for 5 minutes at 140° C. The aluminum electrodes were then weighed and measured. Results are summarized in Table I.

The polyethylene coating formed on the aluminum anode was thick and glossy, and did not show microscopic surface cracks. It was firmly affixed to the metal, and did not peel off.

EXAMPLE III

Control

A piece of aluminum, substantially identical in size and weight to those in Example I was cleaned, washed and dried using the method of Example I. The aluminum was then immersed in the oxidized polyethylene emulsion as in Example I, except that no current source was attached to the aluminum. After remaining in the emulsion five

What is claimed is:
1. The process of preparing a coating of oxidized polyethylene on an electrically conductive surface which comprises dipping electrodes into an aqueous emulsion composition comprising oxidized polyethylene prepared from linear polyethylene having a density of 0.94 to 0.98, a melting point of 128–138° C. and a melt index of less than 0.01, said oxidized polyethylene containing 0.20 to 1.0 milliequivalents carboxyl per gram of oxidized polyethylene, with a water:oxidized polyethylene weight ratio of 80 to 2000:100 emulsifying agent in an amount to provide 1 to 40 parts emulsifying agent per part of said oxidized polyethylene by weight and sufficient base to neutralize the acid groups in said emulsion; attaching between said electrodes a direct current voltage source of from 5 to 150 volts providing 3–25 amperes of current for 2 to 150 minutes; thereby coating one of said electrodes with oxidized polyethylene; removing said coated electrode from the said emulsion; drying said electrode; then sintering said electrode.

2. The process in claim 1, in which the voltage is 22.5 volts.

3. The process of claim 1, in which the emulsion is electrolyzed for 5 minutes.

4. The process in claim 1, in which the electrodes are aluminum.

5. The process according to claim 1, in which the coated electrode is dried at 90–115° C. for 5–20 minutes, then sintered at 130–150° C.

6. The process in claim 1 in which tthe emulsifying agent is morpholine oleate.

References Cited

UNITED STATES PATENTS 2,530,366   11/1950   Gray _____ 204—181
3,213,043   10/1965   Kehr _____ 260—94.9

FOREIGN PATENTS 476,476   8/1951   Canada.

JOHN H. MACK, Primary Examiner.

H. M. FLOURNOY, Assistant Examiner.